Figure 1:

June 7, 1955 M. M. SAFFORD ET AL 2,710,290
ORGANOPOLYSILOXANE-POLYTETRAFLUOROETHYLENE MIXTURES
Filed April 3, 1953 2 Sheets-Sheet 1

Inventors
Arthur M. Bueche,
Moyer M. Safford,
by
Their Attorney.

Inventors
Arthur M. Bueche,
Moyer M. Safford,
by
Their Attorney

United States Patent Office 2,710,290
Patented June 7, 1955

2,710,290

ORGANOPOLYSILOXANE-POLYTETRAFLUORO-ETHYLENE MIXTURES

Moyer M. Safford and Arthur M. Bueche, Schenectady, N. Y., assignors to General Electric Company, a corporation of New York Application April 3, 1953, Serial No. 346,600

18 Claims. (Cl. 260—41)

This invention is concerned with organopolysiloxanes convertible by heat to the cured, solid elactic state having improved strength, particularly tear properties. More particularly the invention relates to a mixture of ingredients comprising (1) an organopolysiloxane convertible by heat to the cured, solid elastic state and (2) a minor proportion of fibers of solid polytetrafluoroethylene intimately and homogeneously dispersed in a random fashion throughout the aforesaid organopolysiloxane. The invention also includes within its scope methods of obtaining the aforesaid convertible mixture of ingredients as well as cured or vulcanized products comprising the aforesaid mixture of ingredients.

Organopolysiloxanes convertible by heat to the solid, cured, elastic state (also known as "silicone rubbers") have found eminent use in applications requiring resistance to elevated temperatures of the order of from about 125–175° C. for extended periods of time. In order to improve the physical properties, for instance, tensile strength, elongation, and particularly the tear strength, of such polymeric materials, various reinforcing agents and fillers have been incorporated for this purpose. However, these fillers or reinforcing agents have not been able to improve to any desirable degree, the tear strength of the convertible organopolysiloxane to a point which approaches the tear strength of other synthetic and natural rubbers including, for instance, butadiene-styrene rubbers, butadiene-acrylonitrile rubbers, etc. In addition, when such filled and cured organopolysiloxanes are heated for extended periods of time at elevated temperatures of the order of from about 200° to 250° C., it has been found in the past that the physical properties, particularly the strength properties of these cured materials, depreciate markedly so that the effective temperature range within which the silicone rubbers can be employed is undesirably reduced.

We have now discovered that we can obtain improved cured, solid, elastic organopolysiloxanes having tear strengths markedly superior to the tear strength of cured organopolysiloxanes hereinbefore known by incorporating in such convertible organopolysiloxanes (in addition to the usual fillers) prior to heat curing or vulcanization thereof, a minor proportion, preferably less than 25%, by weight, based on the weight of the organopolysiloxane, of particles (or granules) of polytetrafluoroethylene and thereafter subjecting the mixture of ingredients containing the polytetrafluoroethylene to a shearing deformation and massaging action whereby particles of polytetrafluoroethylene are caused to elongate and are actually drawn into fibers intimately and homogeneously disposed in a random fashion throughout the convertible organopolysiloxane. By means of this shearing deformation action, and elongation of the particles of polytetrafluoroethylene into fibers, threads or filaments (for brevity hereinafter referred to as "fibers"), which fibers are also subjected to a drawing action similar to that encountered in the drawing of synthetic fibers for the usual purpose of orientation of the micelles, the latter, in addition to remaining dispersed as individual non-contiguous or non-continuous fibers, may also form to a minor extent, a lattice work due to the possible fusion of adjacent fibers of polytetrafluoroethylene. Very few of the polytetrafluoroethylene particles are believed to escape this shearing deformation.

It is believed that the individual fibers formed from the particles of polytetrafluoroethylene are in many respects in a highly oriented state (i. e., the micelles are highly oriented) as a result of the shearing, grinding and drawing action. This belief is substantiated by the fact that when individual fibers (which may be from one-quarter inch to 2 inches in length or more and from about several microns to 50 or more microns in diameter) are carefully removed from the matrix comprising the convertible organopolysiloxane, the fibers are found to be extremely strong and tough.

The fact that the particles of polytetrafluoroethylene could be treated within the structure of the convertible organopolysiloxane to impart to cured products therefrom the improved physical properties, particularly improved tear strength, was entirely unexpected and in no way could have been predicted for the following reasons. Attempts to incorporate, for instance, particles of a very similar polymer, namely, solid polychlorotrifluoroethylene, and subjecting such mixture of ingredients to the same shearing action, gave no improvement in the tear strength of the heat-converted products prepared from such mixtures, apparently due to the fact that no detectable threads or fialments were formed from the polychlorotrifluoroethylene particles. Moreover, no improvement in results were obtained by cutting up thin sheets of polytetrafluoroethylene into relatively long fibers and dispersing the latter throughout the convertible organopolysiloxane so as to subject the mixture to the same shearing action; in the latter case again, no improvement in properties was noted in the heat-converted product. Finally, when particles of polyethylene were incorporated in the convertible organopolysiloxane, and the mixture of the latter and the polyethylene particles subjected to the same shearing action, the strength properties of the cured products prepared therefrom, particularly the tear strength properties, were much poorer than the original converted organopolysiloxane from which the polyethylene was omitted, even though fibers of polyethylene were present in the matrix of the converted organopolysiloxane.

The convertible silicone compositions hereindescribed, which may be highly viscous masses or gummy, elastic solids, depending on the state of condensation, the condensing agent employed, the starting organopolysiloxane used to make convertible organopolysiloxanes, etc., will hereinafter be referred to as "convertible organopolysiloxane" or more specifically as "convertible methylpolysiloxane" and "convertible methyl and phenyl polysiloxane."

Although convertible organopolysiloxanes with which the present invention is concerned are well known, for purposes of showing persons skilled in the art the various convertible organopolysiloxanes which may be employed in the practice of the present invention, attention is directed to the convertible organopolysiloxanes disclosed and claimed in Agens Patent 2,448,756 and Sprung et al. Patent 2,448,556, both issued September 7, 1948; Sprung Patent 2,484,595 issued October 11, 1949; Krieble et al. Patent 2,457,688 issued December 28, 1948; Hyde Patent 2,490,357 issued December 6, 1949; Marsden Patent 2,521,528 issued September 5, 1950; and Warrick Patent 2,541,137 issued February 13, 1951.

It will of course be understood by those skilled in the art that other convertible organopolysiloxanes containing the same or different silicon-bonded organic, for instance, hydrocarbon substitutents (e. g., methyl, ethyl, propyl, vinyl, allyl, phenyl, tolyl, xylyl, benzyl, phenylethyl naphthyl, chlorophenyl, both methyl and phenyl, etc., radicals) connected to silicon atoms by carbon-silicon linkages, may be employed without departing from the scope of the invention.

The particular convertible organopolysiloxane used is not critical and may be any one of those described in the foregoing patents, which are generally obtained by condensation of a liquid organopolysiloxane containing an average of from about 1.95, preferably from about 1.98 to about 2.25 organic groups per silicon atom. The usual condensing agents which may be employed and which are well known in the art may include, for instance, ferric chloride hexahydrate, phenyl phosphoryl chloride, alkaline condensing agents, such as potassium hydroxide, sodium hydroxide, etc. These convertible organopolysiloxanes generally comprise polymeric diorganosiloxanes which may contain, for example, up to 2 mol percent copolymerized monoorganosiloxane, for example, copolymerized monomethylsiloxane. Generally, we prefer to use as the starting liquid organopolysiloxanes from which the convertible, for example, heat-convertible organopolysiloxane is prepared, one which contains about 1.999 to 2.01, inclusive, organic groups, for example, methyl groups per silicon atom, and where more than about 80 percent, preferably 90 percent, of the silicon atoms in the polysiloxane contain two silicon-bonded alkyl groups.

The starting organopolysiloxanes used to make convertible organopolysiloxanes by condensation thereof preferably comprise organic substitutents consisting essentially of monovalent organic radicals attached to silicon through carbon-silicon linkages, there being on the average between 1.95 and 2.25 (e. g., 1.98 to 2.02) organic radicals per silicon atom, and in which the siloxane units consist of units of the structural formula $R_2SiO$, where R is preferably a radical of the group consisting of methyl and phenyl radicals. At least 90 percent of the total number of R groups are preferably methyl radicals. The polysiloxane may be one in which all of the siloxane units are $(CH_3)_2SiO$, or the siloxane may be a copolymer of dimethylsiloxane and a minor amount (e. g., from 1 to 20 or more mol percent) of any of the following units alone or in combination therewith:

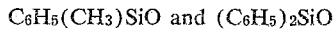

$C_6H_5(CH_3)SiO$ and $(C_6H_5)_2SiO$

A small amount of cure accelerator, for instance, benzoyl, peroxide, tertiary butyl perbenzoate, zirconyl nitrate, boron hydrides, etc., may be incorporated into the convertible organopolysiloxane for the purpose of accelerating the cure, as is more particularly described in various patents mentioned above calling for the use of these materials as curing agents for silicone rubber.

The curing agents function to yield cured products having better properties, for instance, improved elasticity, tensile strength, and tear resistance, than is obtained by curing a similar gum composition or convertible organopolysiloxane free of any curing agent. The amount of curing agent which may be used may be varied widely, for example, from about 0.1 to about 8 percent or more, preferably from about 2 to 6 percent, by weight, based on the weight of the convertible organopolysiloxane.

The particles or granules of the polytetrafluoroethylene employed in the practice of the present invention are readily available on the market and may be purchased under the name of Teflon from E. I. du Pont de Nemours of Wilmington, Delaware. Any suitable particle size may be employed as, for instance, particles having an average particle diameter of from about 0.15 to about 100 microns or more in diameter are conveniently used in the practice of the present invention. The use of smaller sized particles of solid polytetrafluoroethylene will give smaller, thinner fibers or filaments, while larger particles of the solid polytetrafluoroethylene, under the shearing action to which the mixture of the latter and the convertible organopolysiloxane is subjected, will give coarser, longer individual fibers. Generally, the polytetrafluoroethylene may be used in the dry state, for instance, as a dry powder, or as larger particles, e. g., as granules or crumbs. Alternatively, one can also employ dispersions of polytetrafluoroethylene (which do not adversely affect the convertible organopolysiloxane) in, for instance, water wherein the solids content of such dispersion is preferably sufficiently high so that the presence of the liquid phase will not undesirably interfere with the introduction of the particles of polytetrafluoroethylene into the convertible organopolysiloxane.

The amount of the polytetrafluoroethylene employed in the practice of the present invention (at the time it is incorporated in the convertible organopolysiloxane) may be varied within fairly wide limits and is advantageously within the range of from about 1 to 20 percent, preferably from about 3 to 15 percent, by weight, based on the weight of the convertible organopolysiloxane. If the particles of polytetrafluoroethylene are incorporated on the usual rubber compounding mill (i. e., using differential rolls), it will be found that greater difficulty will be encountered in incorporating amounts in excess of 15 to 20 percent of the polytetrafluoroethylene, based on the weight of the convertible organopolysiloxane, due to the fact that there will be a tendency for the mixture of ingredients to become slippery and to fall off the rolls of the milling machine. In addition, excessively large amounts of the polytetrafluoroethylene will make it more difficult to obtain a coherent sheet. This, of course, does not mean that other means for incorporating the particles or granules of polytetrafluoroethylene may not be employed, as long as after the incorporation of the particles of polytetrafluoroethylene, the mixture of ingredients is subjected to the proper shearing action required to cause elongation of the particles of polytetrafluoroethylene into fibers.

The manner whereby the particles of polytetrafluoroethylene are incorporated in the convertible organopolysiloxanes may be varied widely so long as the procedure whereby this is accomplished is attended by a shearing action to effect elongation of the polytetrafluoroethylene particles into fibers. One method whereby this shearing action can be conveniently and advantageously employed involves the use of the usual rubber compounding mills which have differential rolls operating at different speeds. Generally, it is best to first place the convertible organopolysiloxane on the rolls until a sheet has been formed, and thereafter incorporate whatever filler and curing agent is to be used. After this, the particles of polytetrafluoroethylene are incorporated into the convertible organopolysiloxane using the same rolls. If desired, one or more of the differential rolls may be heated (e. g., about 50 to 75° C.) although this is often not necessary. As the rolling on the mill continues, and as the addition of all the particles of polytetrafluoroethylene is nearing completion, it is generally desirable to widen the nip between the adjacent rolls of the mill to a point ranging from about 1/16" to about 1/4" or more to permit better distribution of the polytetrafluoroethylene particles and fibers within the convertible organopolysiloxane, and also to avoid as much as possible the deterioration or breakdown of the fibers formed as the result of the milling operation. The individual formed fibers which are present in a random distribution form an intermeshing composite structure which imparts the markedly improved tear resistance to the heat-converted organopolysiloxane without in any way detrimentally affecting the properties of the finally heat-treated product.

Although in almost every instance, the properties of the converted organopolysiloxane will be improved by the presence of the sheared elongated polytetrafluoroethylene particles, it will generally be found that the improvement in properties will approach a maximum depending on the length of time during which the mixture comprising the convertible organopolysiloxane and the particles of polytetrafluoroethylene are milled on the compounding rolls. In this connection, it has been found that milling of the ingredients for too long a period of time will tend to minimize the improvement in properties realized as a result of incorporating the polytetrafluoroethylene. We have found that using, for example, a convertible methylpolysiloxane, optimum results are obtained when milling times of the order of about 3 to 15 minutes on the compounding rolls (after the particles of polytetrafluoroethylene are added) are employed. Obviously, such milling times (especially when using the above-described differential rolls of the usual rubber compounding mill) may be varied within wide limits depending upon such factors as the convertible organopolysiloxane employed, the amount of polytetrafluoroethylene incorporated, the initial size of the particles of polytetrafluoroethylene, the temperature at which the incorporation of the polytetrafluoroethylene in the convertible polysiloxane is carried out, the filler used, etc. Persons skilled in the art will have little difficulty in determining the optimum milling times which can advantageously be employed in each case in the practice of the present invention.

Obviously other methods may be used to incorporate the particles of polytetrafluoroethylene in the convertible organopolysiloxane in addition to the use of the differential rolls described above. Thus, it may be possible to make a mechanical mixture of the convertible organopolysiloxane and particles of polytetrafluoroethylene, including the filler and curing agent, and thereafter putting the compound through an extrusion machine employing a worm gear wherein a similar shearing action is exerted on the particles of polytetrafluoroethylene. We prefer to employ rubber compounding rolls for effecting the desired modification and distribution of the particles of polytetrafluoroethylene in the convertible organopolysiloxane for several reasons. One reason resides in the fact that such rolls are normally used for incorporating the various ingredients in a convertible organopolysiloxane and such rubber mills are readily available for the purpose. In addition, the use of such a mill will generally give optimum and most advantageous distribution, i. e., random distribution of the fibers of the polytetrafluoroethylene throughout the convertible organopolysiloxane.

Various fillers may be present in the convertible organopolysiloxane containing the polytetrafluoroethylene prior to curing or vulcanization thereof. Among such fillers may be mentioned, for instance, silica aerogel, gamma alumina (described and claimed in Savage application Serial No. 295,339, filed June 24, 1952, and assigned to the same assignee as the present invention, now U. S. Patent 2,671,069 issued March 2, 1954), titanium dioxide, lithopone, calcium carbonate, various forms of carbon, talc, etc. The amount of filler incorporated in the convertible organopolysiloxane may be varied within wide limits and may range, for instance, from about 10 to 300% of weight of the convertible organopolysiloxane. The actual amount of filler used will depend upon such factors as the type of filler, the convertible organopolysiloxane, the application for which the cured product is intended, the proportion of polytetrafluoroethylene present, etc. A range which advantageously may be employed on a weight basis is from about 0.2 to 3 parts of filler per part of convertible organopolysiloxane.

After suitable incorporation in the convertible organopolysiloxane of the essential ingredients, such as, for instance, particles of polytetrafluoroethylene, filler, curing agent, etc., the compound thus formed may be molded, extruded, knife-coated, used for dipping purposes (by employing suitable solvents such as toluene, xylene, etc.), and thereafter cured under heat and under pressure (if the latter is required) at temperatures ranging from about 125–200° C. In connection with molding the compositions herein described, preliminary molding temperatures of from about 125 to 150° C. at pressures ranging from about 500 to 1000 p. s. i. for times of the order of from about 5 to 30 minutes are advantageously employed. It is thereafter desirable and in many instances essential, in order to bring out the optimum properties, that the molded article be subjected to further heat treatment, usually outside the mold, at a more elevated temperature of the order of about 200 to 250° C. for from 2 to 24 hours.

In order that those skilled in the art may better understand how the present invention may be practiced, the following examples are given by way of illustration and not by way of limitation. All parts are by weight. The polytetrafluoroethylene employed in the following examples was in the form of granules having an average particle diameter of about 30 to 60 microns (sold by the Du Pont Company, Wilmington, Delaware, under the name of Teflon TE–3058).

EXAMPLE 1

A highly viscous convertible polymeric dimethylsiloxane was prepared by condensing octamethylcyclotetrasiloxane at a temperature of about 150° C. for approximately 6 hours with about 0.01%, by weight, thereof of potassium hydroxide. This polymer was soluble in benzene and had a slight flow at room temperature. This convertible polymeric dimethylsiloxane, which for brevity will be referred to hereinafter as "polydimethylsiloxane" was then mixed on a rubber compounding mill (having differential rolls) with varying amounts of the above-described polytetrafluoroethylene. In addition to the weight of the polytetrafluoroethylene, the basic formulation (so designated in Table I below) including the polydimethylsiloxane consisted of the following:

100 parts polydimethylsiloxane
40 parts silica aerogel (Santocel C)
1.65 parts benzoyl peroxide With the exception of Sample No. 2, which was milled for about five minutes on the rolls to incorporate the polytetrafluoroethylene, the remaining samples were milled for about two minutes on the same rolls for the same purpose. Each of the formulations was then pressed between flat plates for 20 minutes at 125° C. at a pressure of about 500 p. s. i. and thereafter further heat-treated, that is cured, in a circulating air oven, for 24 hours, at 150° C. and then aged in a similar circulating air oven at 250° C. for varying lengths of time. The following Table I shows the formulations for the various sample numbers, while Table II shows the properties of the various samples after the various heat-aging operations.

Table I

| Sample No. | Parts Polytetrafluoroethylene per 140 parts of Basic Formulation* |
|---|---|
| 1 | 10 |
| 2 | 10 |
| 3 | 6 |
| 4 | 2 |
| 5 | 0 |

*This formulation is more particularly described above.

Table II

| Sample No. | Heat Treatment | Tensile, p. s. i. | Percent Elongation | Tear Strength, p./i. |
|---|---|---|---|---|
| 1 | 1 day at 150° C | 952 | 300 | 186 |
| | 1 day at 250° C | 1,020 | 300 | 194 |
| | 2 days at 250° C | 918 | 200 | 209 |
| | 3 days at 250° C | 1,110 | 200 | 239 |
| | 4 days at 250° C | | | 226 |
| | 5 days at 250° C | | | 210 |
| 2 | 1 day at 150° C | 1,096 | 300 | 250 |
| | 1 day at 250° C | 1,205 | 400 | 233 |
| | 2 days at 250° C | 1,123 | 200 | 242 |
| | 3 days at 250° C | 1,300 | 250 | 237 |
| | 4 days at 250° C | 1,100 | 200 | 220 |
| | 5 days at 250° C | | | 232 |
| | 6 days at 250° C | | | 255 |
| 3 | 1 day at 150° C | 1,033 | 300 | 178 |
| | 1 day at 250° C | 1,160 | 200 | 118 |
| | 2 days at 250° C | 930 | 200 | 173 |
| | 3 days at 250° C | 880 | 200 | 154 |
| | 4 days at 250° C | 1,100 | 200 | 170 |
| | 7 days at 250° C | 1,080 | 200 | 154 |
| 4 | 1 day at 150° C | 824 | 200 | 71 |
| | 1 day at 250° C | 850 | 200 | 65 |
| | 2 days at 250° C | 825 | 200 | 52 |
| | 3 days at 250° C | 750 | 200 | 58 |
| | 4 days at 250° C | 792 | 200 | 69 |
| | 7 days at 250° C | 831 | 200 | 54 |
| 5 | 1 hour at 150° C | 800 | 400 | 80 |
| | 1 day at 250° C | 600 | 240 | 65 |
| | 3 days at 250° C | 590 | 200 | 65 |

Figure 2:

The accompanying Figure 1 is a photograph magnified twenty times of a section of the cured (after 24 hours at 150° C.) methylpolysiloxane identified above as Sample No. 1 under 50 per cent elongation. It will be noted from a careful examination of the photograph that the individual fibers of polytetrafluoroethylene are randomly distributed through the matrix of the cured methylpolysiloxane and that the fibers are in a varied arrangement, for instance, parallel, crossed, overlapping, etc. Figure 2 is a photograph of individual particles of polytetrafluoroethylene (magnified twenty times) which were employed and incorporated in the convertible methylpolysiloxane prior to curing thereof.

EXAMPLE 2

In this example, varying amounts of the same granules of polytetrafluoroethylene employed in Example 1 were incorporated in silcone rubber formulations employing the polydimethylsiloxane and compounding procedures more particularly described in Example 1. In one case, two different amounts of polytetrafluoroethylene were added to a mixture of ingredients comprising the basic formulation (identified as "Formulation A") described in Example 1 (comprising 100 parts polydimethylsiloxane, 40 parts silica aerogel, and 1.65 parts benzoyl peroxide), and another mixture was prepared by adding the granules of polytetrafluoroethylene to a formulation (identified as "Formulation B") comprising, by weight, 100 parts polydimethylsiloxane, 100 parts diatomaceous earth (Celite 270) and 2.5 parts benzoyl peroxide. These formulations, together with formulations from which the polytetrafluoroethylene was omitted, were pressed in the form of flat sheets for 10 minutes at about 125° C. under a pressure of approximately 500 p. s. i., and thereafter further cured in a circulating air oven for 24 hours at 250° C. The following Table III shows the proportion of ingredients in each formulation while Table IV shows the physical properties of the molded samples after the above-mentioned final 250° C. heat treatment.

Table III

| Sample No. | Parts Formulation A | Parts Formulation B | Parts Polytetrafluoroethylene |
|---|---|---|---|
| 6 | 200 | | 0 |
| 7 | 200 | | 8.5 |
| 8 | 200 | | 15.2 |
| 9 | | 202.5 | 0 |
| 10 | | 202.5 | 15 |

Table IV

| Sample No. | Tensile Strength, p. s. i. | Percent Elongation | Tear Strength, p./i. |
|---|---|---|---|
| 6 | 734 | 273 | 55 |
| 7 | 866 | 250 | 75 |
| 8 | 800 | 200 | 120 |
| 9 | 780 | 100 | 35 |
| 10 | 892 | 70 | 64 |

EXAMPLE 3

In this example, a basic formulation (identified as "Formulation C") comprising, by weight, 100 parts polydimethylsiloxane, 100 parts diatomaceous earth (Celite 270), and 2.5 parts benzoyl peroxide, was mixed, respectively, with 5 and 10 parts of the above-described granules of polytetrafluoroethylene (using the milling procedures described above), and thereafter pressed between flat plates for about 20 minutes at 125° C. at a pressure of about 500 p. s. i. The samples were thereafter further heat-treated, that is, cured, in a circulating air oven for varying lengths of time during which the physical properties of the various samples were determined after each heat treatment. The following Tables V and VI show the proportions of ingredients employed in making the various samples together with the properties of these samples after each heat treatment.

Table V

| Sample No. | Parts Formulation C | Parts Polytetrafluoroethylene |
|---|---|---|
| 11 | 100 | 5 |
| 12 | 100 | 10 |
| 13 | 100 | 0 |

Table VI

| Sample No. | Heat Treatment | Tensile, p. s. i. | Percent Elongation | Tear, p./i. |
|---|---|---|---|---|
| 11 | 1 day at 150° C | 828 | 150 | 120 |
| | 1 day at 250° C | 868 | 50 | 82 |
| | 2 days at 250° C | 1,010 | 50 | 75 |
| | 3 days at 250° C | 1,250 | 50 | 98 |
| | 4 days at 250° C | 1,190 | 50 | 79 |
| | 7 days at 250° C | 1,200 | 50 | 76 |
| 12 | 1 day at 150° C | 819 | 100 | 233 |
| | 1 day at 250° C | 1,100 | 50 | 123 |
| | 2 days at 250° C | 675 | 50 | 157 |
| | 3 days at 250° C | 1,090 | 50 | 143 |
| | 4 days at 250° C | 1,380 | 50 | 191 |
| | 7 days at 250° C | 1,170 | 50 | 131 |
| 3 | 1 hour at 150° C | 600 | 150 | 40 |
| | 1 day at 250° C | 700 | 100 | 47 |
| | 3 days at 250° C | 630 | 40 | 40 |

It will of course be apparent to those skilled in the art that other amounts of polytetrafluoroethylene may be employed in combination with the organopolysiloxane without departing from the scope of the invention. The finely divided or granular particles of polytetrafluoroethylene although well known in the art, can be found more particularly described in such patents as, for instance, U. S. Patents 2,230,654; 2,396,629; 2,400,099; 2,440,190; 2,456,262; and 2,478,229. Obviously, other fillers and curing agents, many examples of which have been given above, may be employed in addition to or in place of those recited in the previous examples. The amount of curing agent which is used may obviously be varied widely but generally has been found to be advantageously in the range of from about 0.1 to about 8 per cent, preferably from about 2 to 6 per cent, by weight, based on the convertible organopolysiloxane. Larger amounts of the curing agent may also be employed where the application recommends such increase, as, for instance, in cases where the compositions herein described are employed for coating and impregnating purposes in connection with fibrous materials, including glass cloth, asbestos cloth, etc., to make, for instance, heater ducts, laminated products, etc.

Obviously, other convertible organopolysiloxanes, in addition to the polydimethylsiloxane described in the foregoing examples, may be employed in combination with the minor proportions of polytetrafluoroethylene. Many examples of these convertible organopolysiloxanes, which preferably comprise convertible hydrocarbon-substituted polysiloxane in which the hydrocarbon radicals (e. g., alkyl, aryl, alkaryl, aralkyl, alkenyl, etc., radicals) are attached to silicon by carbon-silicon linkages, have been described previously and find additional basis in the patents recited above. The presence of copolymerized monocyclic arylsiloxanes, for example, copolymerized diphenylsiloxane or copolymerized methyl phenyl siloxane, in addition to the polydialkylsiloxane, for instance, polydimethylsiloxane, imparts improved low temperature flexibility to the cured silicone rubber products.

The cured, solid, elastic organopolysiloxanes prepared in accordance with the present invention are capable of withstanding elevated temperatures (150° C. to 250° C.) for extended periods of time without undesirable reduction in the properties of the cured products. The same materials also retain their desirable rubbery properties at temperatures as low as —60° C. The high temperature resistance and especially the improved tear strength of these materials make them admirably suitable as insulation materials for electrical conductors, as gasket materials (for instance, in jet airplane applications, etc.), shock absorbers, and for various applications where other natural or synthetic rubbers have heretofore been employed where it is desired to take advantage of the high temperature resistance and the low temperature flexibility of the claimed organopolysiloxanes.

The compositions herein described are useful as valve seats, for instance, in connection with hot water or other heated liquid safety valves, because of their outstanding temperature resistance and freedom from sticking after long periods of use at the elevated temperatures, as well as because of their increased tensile strength and tear resistance. One of the unexpected advantages present in the use of the polymeric tetrafluoroethylene resides in the fact that the cured mixture of organopolysiloxane and polytetrafluoroethylene fibers appears to have better oil resistance (e. g., hydrocarbon oils) and resistance to aromatic solvents (e. g., toluene) than does the same composition from which the polytetrafluoroethylene is omitted. Because of this improved solvent and oil resistance, it is apparent that the compositions herein described may find eminent use as gaskets or as other sealing devices which may come in contact during their use with such oils or solvents.

What we claim as new and desire to secure by Letters Patent of the United States is:

1. A composition of matter comprising a mixture of ingredients comprising (1) an organopolysiloxane convertible by heat to the cured, solid, elastic state, the organic groups of the aforesaid organopolysiloxane comprising monovalent hydrocarbon radicals attached to silicon by carbon-silicon linkages, and there being present in the organopolysiloxane from 1.98 to 2.25 organic groups per silicon atom, and (2) a minor proportion of solid polytetrafluoroethylene dispersed throughout the aforesaid organopolysiloxane in the form of randomly distributed fibers.

2. A composition of matter comprising a mixture of ingredients comprising (1) a methylpolysiloxane convertible by heat to the cured, solid, elastic state and containing an average of from about 1.98 to 2.02 methyl groups per silicon atom and (2) a minor proportion of solid polytetrafluoroethylene dispersed throughout the aforesaid methylpolysiloxane in the form of randomly distributed fibers derived from particles of polytetrafluoroethylene elongated in situ within the matrix of the methylpolysiloxane by means of a shearing deformation action.

3. A composition of matter comprising a mixture of ingredients comprising (1) a methyl phenylpolysiloxane convertible by heat to the cured, solid, elastic state and containing an average of from 1.98 to 2.02 total methyl and phenyl radicals, and (2) a minor proportion of solid polytetrafluoroethylene dispersed through the aforesaid methyl phenylpolysiloxane in the form of randomly distributed fibers derived from particles of polytetrafluoroethylene elongated in situ within the matrix of the methyl phenylpolysiloxane by means of a shearing deformation action.

4. A composition of matter comprising a mixture of ingredients comprising (1) an organopolysiloxane convertible by heat to the cured, solid, elastic state, the organic groups of the aforesaid organopolysiloxane comprising monovalent hydrocarbon radicals attached to silicon by carbon-silicon linkages, there being present from 1.98 to 2.25 organic groups per silicon atom, (2) a minor proportion of solid polytetrafluoroethylene dispersed throughout the aforesaid organopolysiloxane in the form of randomly distributed fibers, (3) a filler and (4) a curing agent for (1).

5. A composition of matter comprising a mixture of ingredients comprising (1) a methylpolysiloxane convertible by heat to the cured, solid, elastic state and containing an average of from about 1.98 to 2.02 methyl groups per silicon atom, (2) a minor proportion of solid polytetrafluoroethylene dispersed throughout the aforesaid methylpolysiloxane in the form of randomly distributed fibers derived from particles of polytetrafluoroethylene elongated in situ within the matrix of the methylpolysiloxane by means of a shearing deformation action, (3) a filler and (4) a curing agent for (1) comprising benzoyl peroxide.

6. A composition of matter comprising a mixture of ingredients comprising (1) a methyl phenylpolysiloxane convertible by heat to the cured, solid, elastic state and containing an average of from 1.98 to 2.02 total methyl and phenyl radicals, (2) a minor proportion of solid polytetrafluoroethylene dispersed through the aforesaid methyl phenylpolysiloxane in the form of randomly distributed fibers derived from particles of polytetrafluoroethylene elongated in situ within the matrix of the methyl phenylpolysiloxane by means of a shearing deformation action, (3) a filler and (4) a curing agent for (1) comprising benzoyl peroxide.

7. A composition of matter as in claim 5 in which the filler is silica aerogel.

8. A composition of matter as in claim 6 in which the filler is silica aerogel.

9. The method for making an organopolysiloxane convertible by heat to the cured, solid, elastic state and having improved strength properties, the organic groups of the aforesaid organopolysiloxane comprising hydrocarbon radicals attached to silicon by carbon-silicon linkages, there being present from 1.98 to 2.25 organic groups per silicon atom, which method comprises dispersing a minor proportion by weight of particles of solid polytetrafluoroethylene within the aforesaid organopolysiloxane and carrying out the dispersal of the aforesaid particles by means of a milling and shearing action whereby the aforesaid particles are caused to elongate and orient into the form of randomly distributed fibers throughout the matrix of the organopolysiloxane.

10. The method for making a methylpolysiloxane convertible by heat to the cured, solid, elastic state having an average ratio of from about 1.98 to 2.02 methyl groups per silicon atom and having improved physical properties, which method comprises dispersing a minor proportion, by weight, of particles of solid polytetrafluoroethylene within the aforesaid methylpolysiloxane and carrying out the dispersal of the aforesaid particles by means of a milling and shearing action whereby the aforesaid particles are caused to elongate and orient into the form of randomly distributed fibers throughout the matrix of the methylpolysiloxane.

11. The method for making a methylphenylpolysiloxane convertible by heat to the cured, solid, elastic state having an average ratio of from about 1.98 to 2.02 total methyl and phenyl radicals per silicon atom and having improved physical properties, which method comprises dispersing a minor proportion of particles of solid polytetrafluoroethylene within the aforesaid methylphenylpolysiloxane and carrying out the dispersal of the aforesaid particles by means of a milling and shearing action whereby the aforesaid particles are caused to elongate and orient into the form of randomly distributed fibers throughout the matrix of the methylphenylpolysiloxane.

12. The process for preparing a heat cured, solid, elastic methylpolysiloxane having an average ratio of from 1.98 to 2.02 methyl groups per silicon atom and having improved strength properties, which process comprises (1) incorporating in the aforesaid methylpolysiloxane a filler and curing agent for the methylpolysiloxane, (2) thereafter incorporating particles of solid polytetrafluoroethylene and subjecting the latter mixture of ingredients to a shearing action by which the particles of polytetrafluoroethylene are caused to elongate and orient in the form of fibers of varying length intimately and randomly dispersed throughout the matrix of the aforesaid methylpolysiloxane and (3) heating the intimately dispersed mixture of ingredients at an elevated temperature for a time sufficient to effect conversion of the latter to the cured, solid, elastic state.

13. The process as in claim 12 in which the filler is silica aerogel.

14. The process as in claim 12 in which the curing agent is benzoyl peroxide.

15. The process for preparing a heat cured, solid elastic methylpolysiloxane having an average of from 1.98 to 2.02 methyl groups for silicon atom and having improved strength properties, which process comprises (1) incorporating in the aforesaid methylpolysiloxane a filler comprising silica aerogel and a curing agent for the aforesaid methylpolysiloxane comprising benzoyl peroxide, (2) thereafter incorporating particles of solid polytetrafluoroethylene and subjecting the latter mixture of ingredients to a shearing action in which the particles of polytetrafluoroethylene are caused to elongate and orient in the form of fibers of varying length intimately and randomly dispersed throughout the matrix of the aforesaid methylpolysiloxane and (3) heating the intimately dispersed mixture of ingredients at an elevated temperature for a time sufficient to effect conversion of the latter to the cured, solid, elastic state.

16. A composition of matter comprising a mixture of ingredients, comprising (1) a cured, solid, elastic organopolysiloxane in which the organic groups comprise monovalent hydrocarbon radicals attached to silicon by carbon-silicon linkages, there being present from 1.98 to 2.25 organic groups per silicon atom, and (2) a minor proportion of solid polytetrafluoroethylene dispersed throughout the aforesaid organopolysiloxane in the form of randomly distributed fibers.

17. A composition of matter comprising a mixture of ingredients comprising (1) a cured, solid, elastic methylpolysiloxane containing an average of from about 1.98 to 2.02 methyl radicals per silicon atom, and (2) a minor proportion of solid polytetrafluoroethylene dispersed throughout the aforesaid methylpolysiloxane in the form of randomly distributed fibers.

18. A composition of matter comprising a mixture of ingredients comprising (1) a cured, solid, elastic methyl phenylpolysiloxane containing an average of from 1.98 to 2.02 total methyl and phenyl radicals per silicon atom and (2) a minor proportion of solid polytetrafluoroethylene dispersed throughout the aforesaid methyl phenylpolysiloxane in the form of randomly distributed fibers.

References Cited in the file of this patent

UNITED STATES PATENTS 2,459,653     Keyes     Jan. 18, 1949